United States Patent
Yasukawa et al.

(10) Patent No.: US 9,864,237 B2
(45) Date of Patent: Jan. 9, 2018

(54) DISPLAY DEVICE

(71) Applicant: Panasonic Liquid Crystal Display Co., Ltd., Hyogo (JP)

(72) Inventors: Hironori Yasukawa, Hyogo (JP); Teruhisa Nakagawa, Hyogo (JP); Daisuke Kajita, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 15/291,224

(22) Filed: Oct. 12, 2016

(65) Prior Publication Data

US 2017/0102575 A1    Apr. 13, 2017

(30) Foreign Application Priority Data

Oct. 13, 2015   (JP) .................. 2015-202476

(51) Int. Cl.
  *G02F 1/1339*   (2006.01)
  *G02F 1/1333*   (2006.01)
  *G02F 1/1362*   (2006.01)

(52) U.S. Cl.
  CPC .... *G02F 1/13394* (2013.01); *G02F 1/133345* (2013.01); *G02F 1/136286* (2013.01); *G02F 2001/13629* (2013.01); *G02F 2201/121* (2013.01); *G02F 2201/123* (2013.01); *G02F 2202/10* (2013.01)

(58) Field of Classification Search
  None
  See application file for complete search history.

(56) References Cited

U.S. PATENT DOCUMENTS

| | | | |
|---|---|---|---|
| 9,287,296 B2* | 3/2016 | Funahashi | H01L 27/124 |
| 2015/0253608 A1* | 9/2015 | Cho | G02F 1/13394 |
| | | | 349/110 |
| 2016/0313614 A1* | 10/2016 | Woo | G02F 1/133345 |

FOREIGN PATENT DOCUMENTS

JP    2002-196338    7/2002

* cited by examiner

*Primary Examiner* — Dennis Y Kim
(74) *Attorney, Agent, or Firm* — Wenderoth, Lind & Ponack, L.L.P.

(57) ABSTRACT

A display device includes a seat holding the spacer. The seat is formed in a superposition region where at least the gate line, the semiconductor layer, the data line, and the organic insulator are superposed on one another in a laminated direction, the superposition region being a region facing the spacer. A whole outer periphery of the seat and the superposition region are superposed on each other in the laminated direction.

6 Claims, 7 Drawing Sheets

DISPLAY DEVICE

CROSS-REFERENCE TO RELATED APPLICATION

This application claims priority from Japanese application JP2015-202476, filed Oct. 13, 2015. This Japanese application is incorporated herein by reference.

TECHNICAL FIELD

The present invention relates to a display device.

BACKGROUND

In the crystal display device, a plurality of spacers are disposed in order to hold a distance (gap) between the first substrate and the second substrate. A seat is formed in the first substrate, a spacer is formed in the second substrate, and the first substrate and the second substrate adhere to each other such that the seat and the spacer contact with each other, thereby holding the gap. Desirably, the spacer is disposed at a position where a numerical aperture of the pixel is not degraded. For example, Japanese unexamined patent application publication JP2002-196338A discloses a spacer disposed proximate two adjacent thin film transistors.

SUMMARY

Desirably the seat is formed flat in order to hold the gap. Although a surface of an organic insulator constituting the first substrate has the flatness at a glance, detailed observation reveals that a curved inclination of the organic insulator occurs by an influence of a step of an underlying layer. A display defect such as yellowing and color mixture occurs when the spacer contacts with a region where the inclination of the organic insulator occurs. Particularly, the inclination of the organic insulator occurs easily because the step is easily generated in association with a laminated structure in a neighborhood of the thin film transistor.

An object of the present disclosure is to provide a display device that reduces the display defect caused by the contact of the spacer with the inclination region.

To solve the above problem, a display device according to the present disclosure comprises: a first substrate; a second substrate facing the first substrate; and a spacer disposed between the first substrate and the second substrate, wherein the first substrate includes: a seat holding the spacer; a plurality of gate lines extending in a row direction; a first insulator covering the plurality of gate lines; a semiconductor layer formed on the first insulator; a plurality of data lines formed on the semiconductor layer to extend in a column direction; a second insulator covering the plurality of data lines; and an organic insulator formed on the second insulator, wherein the seat is a region facing the spacer, the seat is formed in a superposition region where at least the gate line, the semiconductor layer, the data line, and the organic insulator are superposed on one another in a laminated direction, and a whole outer periphery of the seat and the superposition region are superposed on each other in the laminated direction.

The display device according to the present disclosure may further comprise: a plurality of pixel electrodes; a common electrode facing the plurality of pixel electrodes; and a common wiring that is electrically connected to the common electrode, wherein the common electrode is formed on the organic insulator, the common wiring is formed on the common electrode, the common wiring includes a first common wiring extending in a row direction and a second common wiring extending in a column direction from the first common wiring, and the seat is the second common wiring formed in the superposition region.

The display device according to the present disclosure may further comprise: a plurality of pixel electrodes; a common electrode facing the plurality of pixel electrodes; and a common wiring that is electrically connected to the common electrode, wherein the common electrode is formed on the organic insulator, the common wiring is formed on the common electrode, and the seat is a metallic layer that is formed in the superposition region, the metallic layer being formed in a layer identical to the common wiring and being separated from the common wiring.

In the display device according to the present disclosure, the first substrate may further include a third insulator, the third insulator is formed so as to cover the common electrode and the common wiring, and the plurality of pixel electrodes are formed on the third insulator.

In the display device according to the present disclosure, the gate line, the semiconductor layer, and the data line may protrude from the seat in a plan view.

In the display device according to the present disclosure, the gate line may include a protrusion that extends in the column direction in a region where the gate line overlaps the seat in a plan view.

In the display device according to the present disclosure, the data line may include a protrusion that extends in the row direction in a region where the data line overlaps the seat in a plan view.

In the display device of the present disclosure, the seat having the flatness can be formed, which reduces the display defect caused by the contact of the spacer with the inclination region.

DETAILED DESCRIPTION

Hereinafter, an exemplary embodiment of the present disclosure will be described with reference to the drawings. In the exemplary embodiment, a liquid crystal display device is described as an example of display device. However the present disclosure is not limited to the liquid crystal display device. For example the present disclosure may be an organic electroluminescence display (OLED) device.

Figure 1:
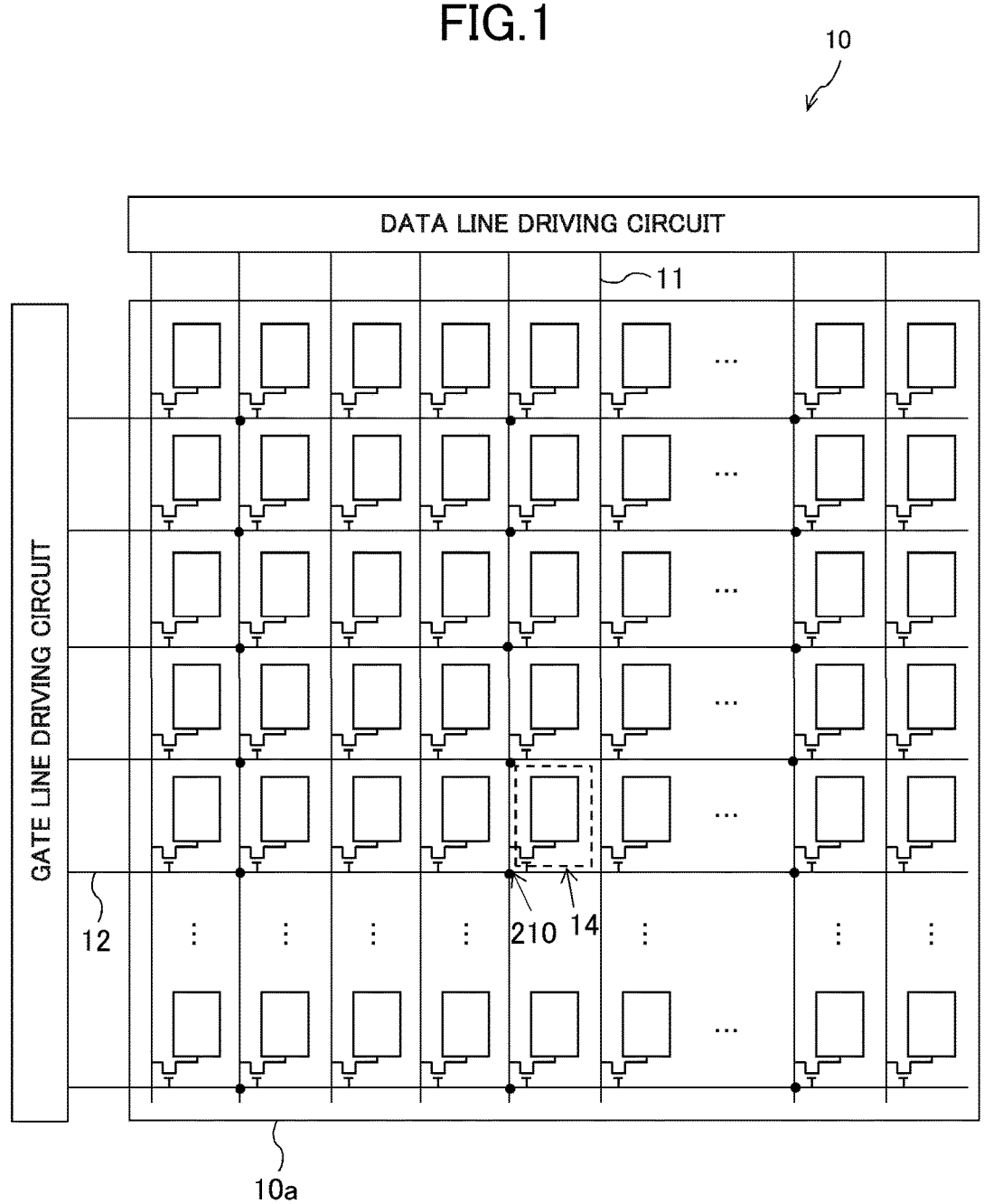
FIG. 1 is a plan view illustrating a schematic configuration of a liquid crystal display device according to an exemplary embodiment.

FIG. 1 is a perspective view illustrating an entire configuration of a liquid crystal display device according to an exemplary embodiment. The liquid crystal display device includes display panel 10 that displays an image, a driving circuit (data line driving circuit, gate line driving circuit) that drives display panel 10, a control circuit (not illustrated) that controls the driving circuit, and a backlight (not illustrated) that irradiates display panel 10 with light from a rear surface side. In display region 10a of display panel 10, pixels 14 each of which is surrounded by two adjacent data lines 11 and two adjacent gate lines 12 are arrayed into a matrix shape in row and column directions. It is assumed that the column direction is a direction in which data line 11 extends, and that the row direction is a direction in which the gate line 12 extends. Spacer 210 (to be described later) is also illustrated in FIG. 1.

Figure 2:
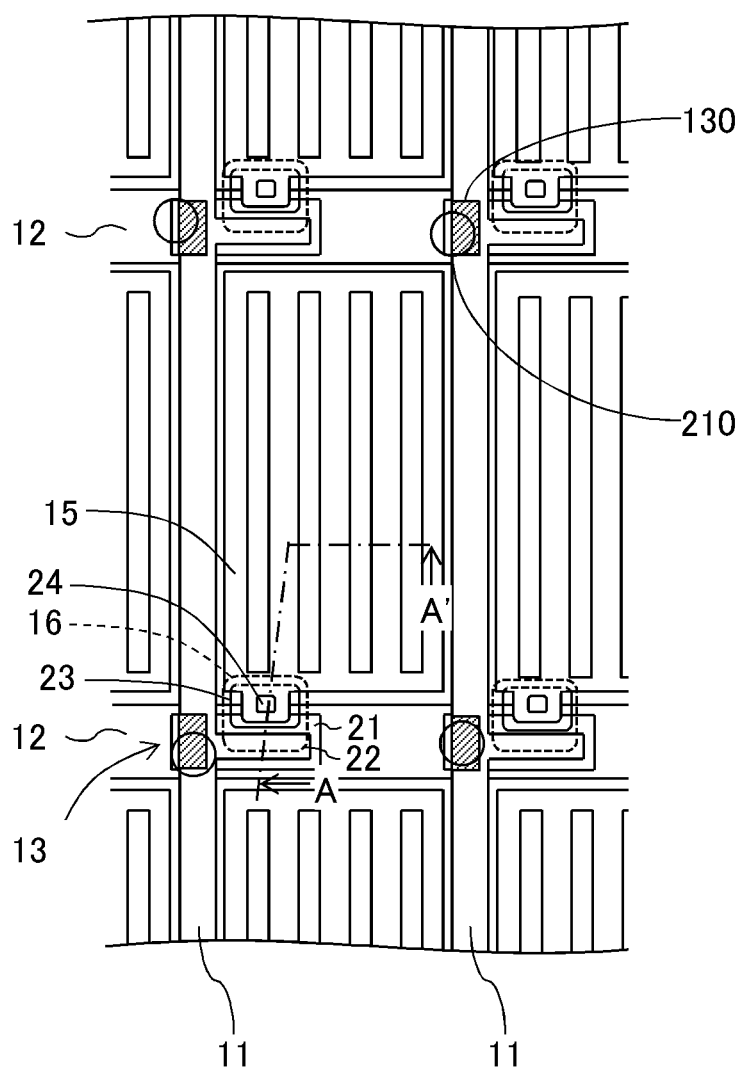
FIG. 2 is a plan view illustrating a configuration of pixels.
Figure 2:
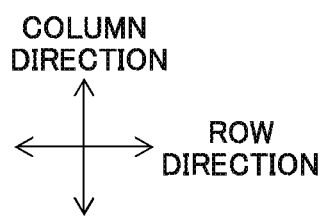
Figure 3:
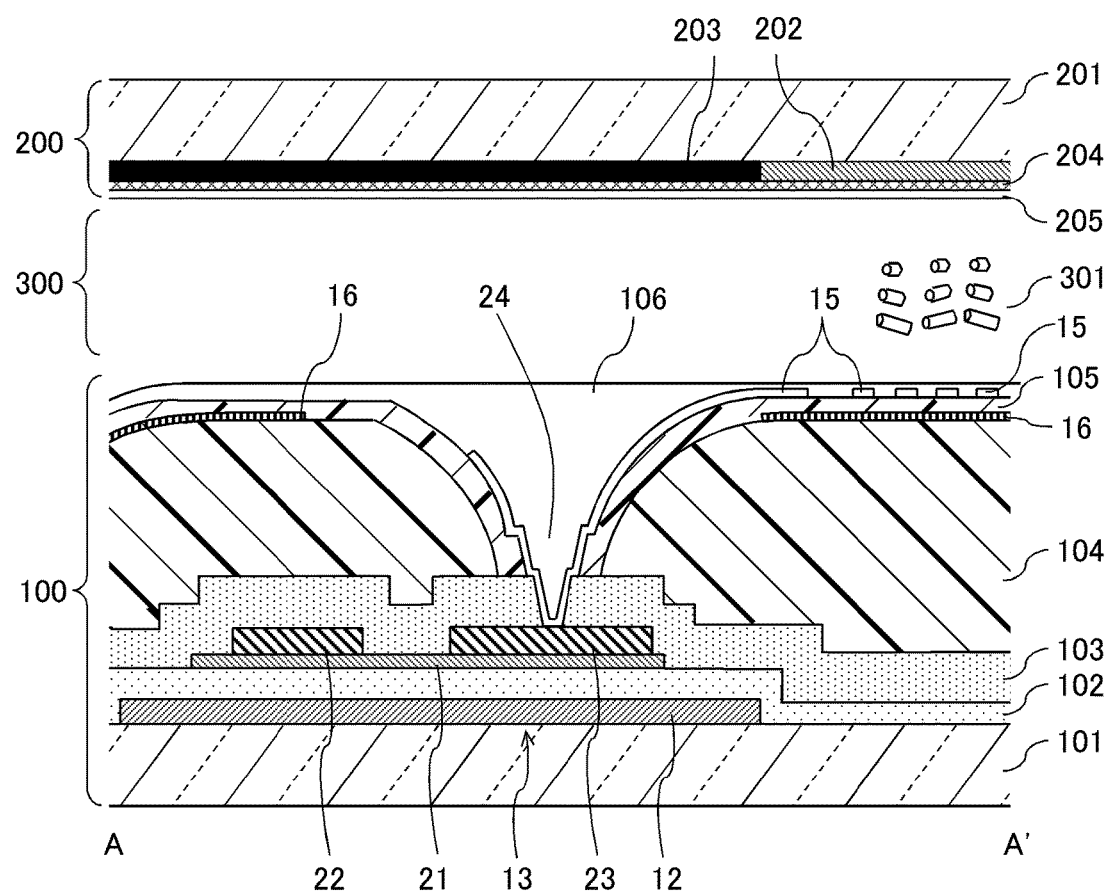
FIG. 3 is a cross-sectional view taken along a line A-A' in FIG. 2.

FIG. 2 is a plan view illustrating a configuration of pixel 14. FIG. 3 is a sectional view taken on line A-A' in FIG. 2. A specific configuration of display panel 10 will be described below with reference to FIGS. 2 and 3.

In FIG. 2, a region sectioned by two adjacent data lines 11 and two adjacent gate lines 12 corresponds to one pixel 14. Thin film transistor 13 is provided in each pixel 14. Thin film transistor 13 is formed near an intersection part of data line 11 and gate line 12. Thin film transistor 13 includes semiconductor layer 21 formed on first insulator 102 and drain electrode 22 and source electrode 23, which are formed on semiconductor layer 21 (see FIG. 3). Drain electrode 22 is electrically connected to data line 11, and source electrode 23 is electrically connected to pixel electrode 15 through contact hole 24.

Pixel electrode 15 including a transparent conductive film such as Indium Tin Oxide (ITO) is formed in each pixel 14. Pixel electrode 15 includes a plurality of openings (slit), and is formed into a stripe shape. There is no limitation to a shape and a number of the opening. One common electrode 16 including the transparent conductive film such as ITO is formed in common to pixels 14 while facing pixel electrode 15. An opening is formed to electrically connect pixel electrode 15 and source electrode 23 to each other in a region where common electrode 16 overlaps contact hole 24 and source electrode 23 of thin film transistor 13. Each pixel 14 is covered with common electrode 16 except for the region where thin film transistor 13 is formed.

As illustrated in FIG. 3, display panel 10 includes TFT substrate 100 (first substrate) disposed on the rear surface side, CF substrate 200 (second substrate) disposed on a display surface side, and liquid crystal layer 300 sandwiched between TFT substrate 100 and CF substrate 200.

In TFT substrate 100, gate line 12 is formed on glass substrate 101, and first insulator 102 is formed so as to cover gate line 12. A step reflecting a planar shape or a thickness of gate line 12 is generated in a surface of first insulator 102. Gate signal line 12 is formed by a metallic material mainly containing aluminum (Al), molybdenum (Mo), titanium (Ti), or copper (Cu), a plurality of laminated layers thereof, an alloy in which tungsten (w), manganese (Mn), or titanium (Ti) is added to the metallic material, or a laminated metallic layer of a combination thereof. First insulator 102 can be made of a known material.

Semiconductor layer 21 is formed on first insulator 102. Drain electrode 22 and source electrode 23 are formed on semiconductor layer 21, and second insulator 103 is formed so as to cover drain electrode 22 and source electrode 23. Organic insulator 104 is formed on second insulator 103. A step reflecting planar shapes or thicknesses of semiconductor layer 21, drain electrode 22, and source electrode 23 is generated in the surface of second insulator 103. A gently curved inclination influenced by the step generated in the surface of second insulator 103 occurs in the surface of organic insulator 104. Second insulator 103 can be made of silicon nitride (SiN) or silicon dioxide ($SiO_2$). Organic insulator 104 is made of a photosensitive organic material mainly containing acryl.

Common electrode 16 is formed on organic insulator 104, and third insulator 105 is formed so as to cover common electrode 16. The surface of common electrode 16 is formed while reflecting a surface shape of organic insulator 104. The surface of third insulator 105 is formed while reflecting the surface shape or thicknesses of common electrode 16 and organic insulator 104. Third insulator 105 can be made of a known material.

Pixel electrode 15 is formed on third insulator 105, and alignment film 106 is formed so as to cover pixel electrode 15. Pixel electrode 15 is electrically connected to source electrode 23 through contact hole 24 made in second insulator 103, organic insulator 104, and third insulator 105. Alignment film 106 may be an alignment film subjected to a rubbing alignment process or a light alignment film subjected to a light alignment process.

Although not illustrated, a polarizing plate and the like are formed on TFT substrate 100.

In CF substrate 200, color filter 202 (for example, a red color filter, a green color filter, and a blue color filter) and black matrix 203 are formed on glass substrate 201, and overcoat layer 204 is formed so as to cover color filter 202 and black matrix 203. Black matrix 203 is made of a resin material in which black pigment is used or a metallic material. Overcoat layer 204 is made of an organic material.

Alignment film 205 is formed on overcoat layer 204. Alignment film 205 may be an alignment film subjected to the rubbing alignment process or a light alignment film subjected to the light alignment process.

Although not illustrated, a polarizing plate and the like are formed on CF substrate 200.

Liquid crystal 301 is sealed in liquid crystal layer 300. Liquid crystal 301 may be a negative liquid crystal having a negative dielectric anisotropy or a positive liquid crystal having a positive dielectric anisotropy.

The laminated structure of each part constituting pixel 14 is not limited to the structure in FIG. 3, but a known structure can be applied. As described above, the liquid crystal display device has the IPS-system configuration. The configuration of the liquid crystal display device is not limited to the IPS-system configuration.

A liquid crystal display device driving method will be briefly described below. A scanning gate voltage (gate-on voltage, gate-off voltage) is supplied to gate line 12 from the gate line driving circuit. A video data voltage is supplied to data line 11 from the data line driving circuit. When the gate-on voltage is supplied to gate line 12, thin film transistor 13 is put into an on state, and the data voltage supplied to data line 11 is transmitted to pixel electrode 15 through drain electrode 22 and source electrode 23. A common voltage (Vcom) is supplied to common electrode 16 from a common electrode driving circuit (not illustrated). Therefore, liquid crystal 301 is driven by an electric field from pixel electrode 15 to common electrode 16 through liquid crystal layer 300 and the opening of pixel electrode 15. Liquid crystal 301 is driven to control transmittance of light transmitted through liquid crystal layer 300, thereby displaying the image. The liquid crystal display device driving method is not limited to the above method, and a known method can be applied.

In the liquid crystal display device of the exemplary embodiment, a plurality of spacers 210 are disposed in order to hold a distance (gap) between TFT substrate 100 and CF substrate 200. Seat 130 is formed in TFT substrate 100, spacer 210 is formed in CF substrate 200, and TFT substrate 100 and CF substrate 200 adhere to each other such that seat 130 and spacer 210 contact with each other, thereby holding the gap. Spacer 210 may include two kinds of spacers having different heights. Specifically, spacer 210 may include a main spacer that contacts with seat 130 in a normal state and a sub-spacer, which does not contact with seat 130 in the normal state, but contacts with seat 130 when display panel 10 changes. The provision of the sub-spacer can achieve improvement of a pressure resistance and suppression of bubble generation during low temperature.

Preferably spacer 210 is disposed at a position where a numerical aperture of the pixel is not degraded, for example, near thin film transistor 13. However, as illustrated in FIG. 3, in organic insulator 104, the curved inclination region occurs easily near thin film transistor 13 by the influence of the laminated structure (particularly, a step of the insulator) in the underlying layer. The display defect occurs easily when spacer 210 contacts with the inclination region. In the liquid crystal display device of the exemplary embodiment, the display defect caused by the contact of spacer 210 with the inclination region can be reduced by improving the flatness of seat 130 formed in TFT substrate 100.

Figure 4:
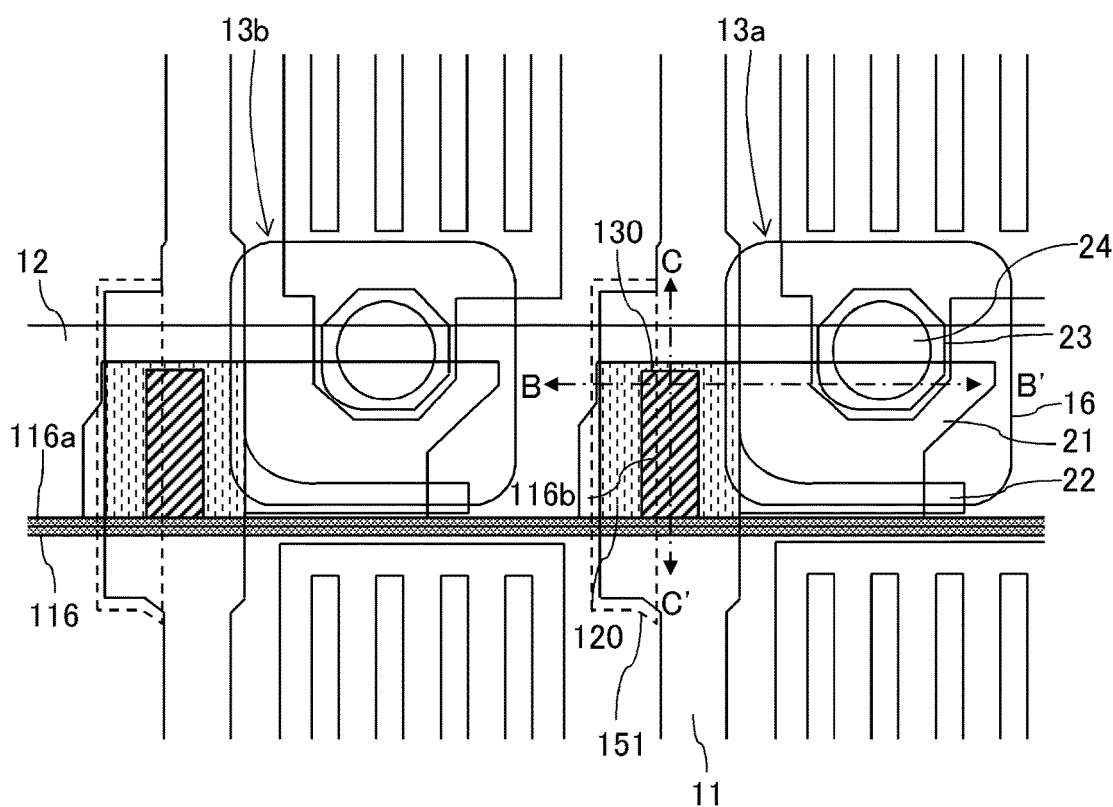
FIG. 4 is a partly expansion view illustrating a TFT substrate according to an exemplary embodiment.
Figure 5:
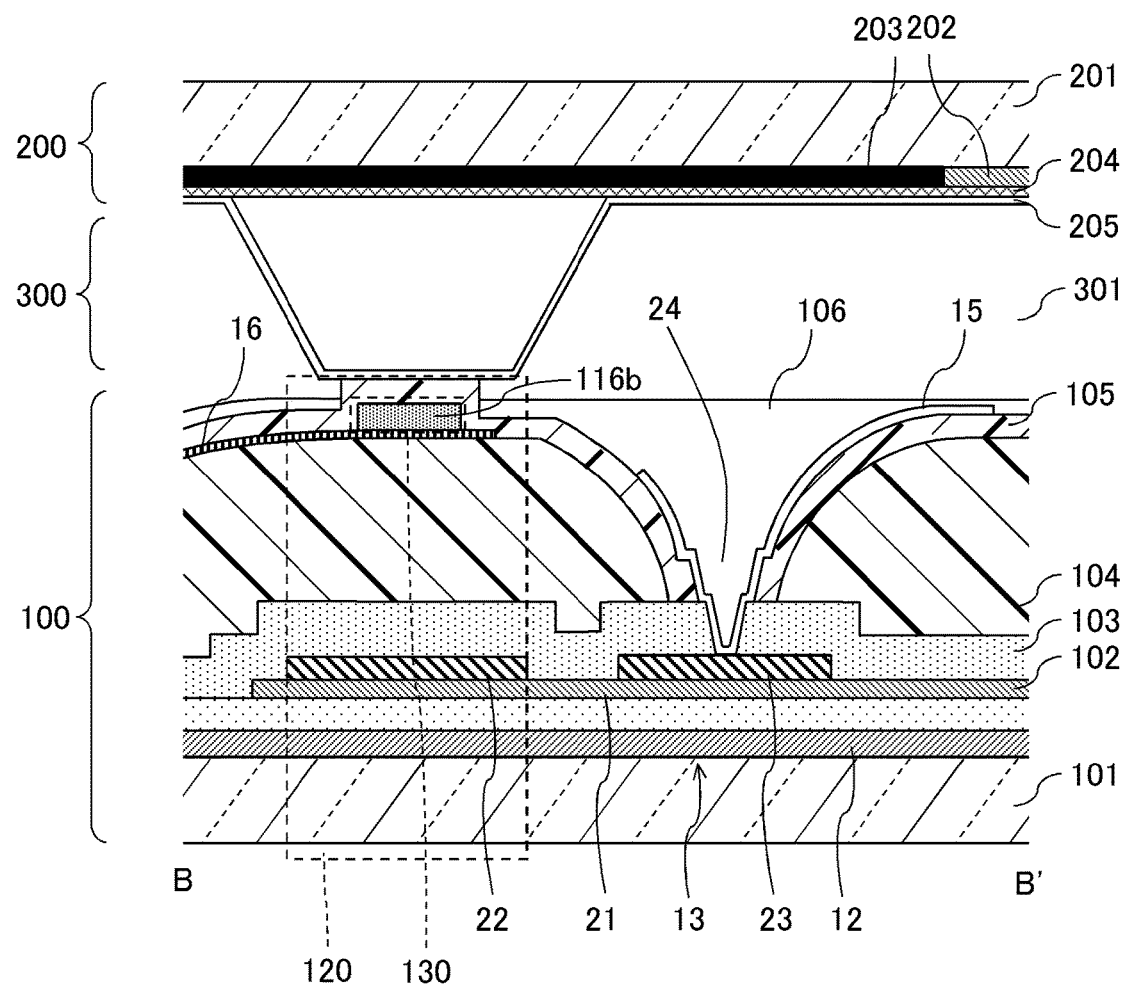
FIG. 5 is a cross-sectional view taken along a line B-B' in FIG. 4.
Figure 6:
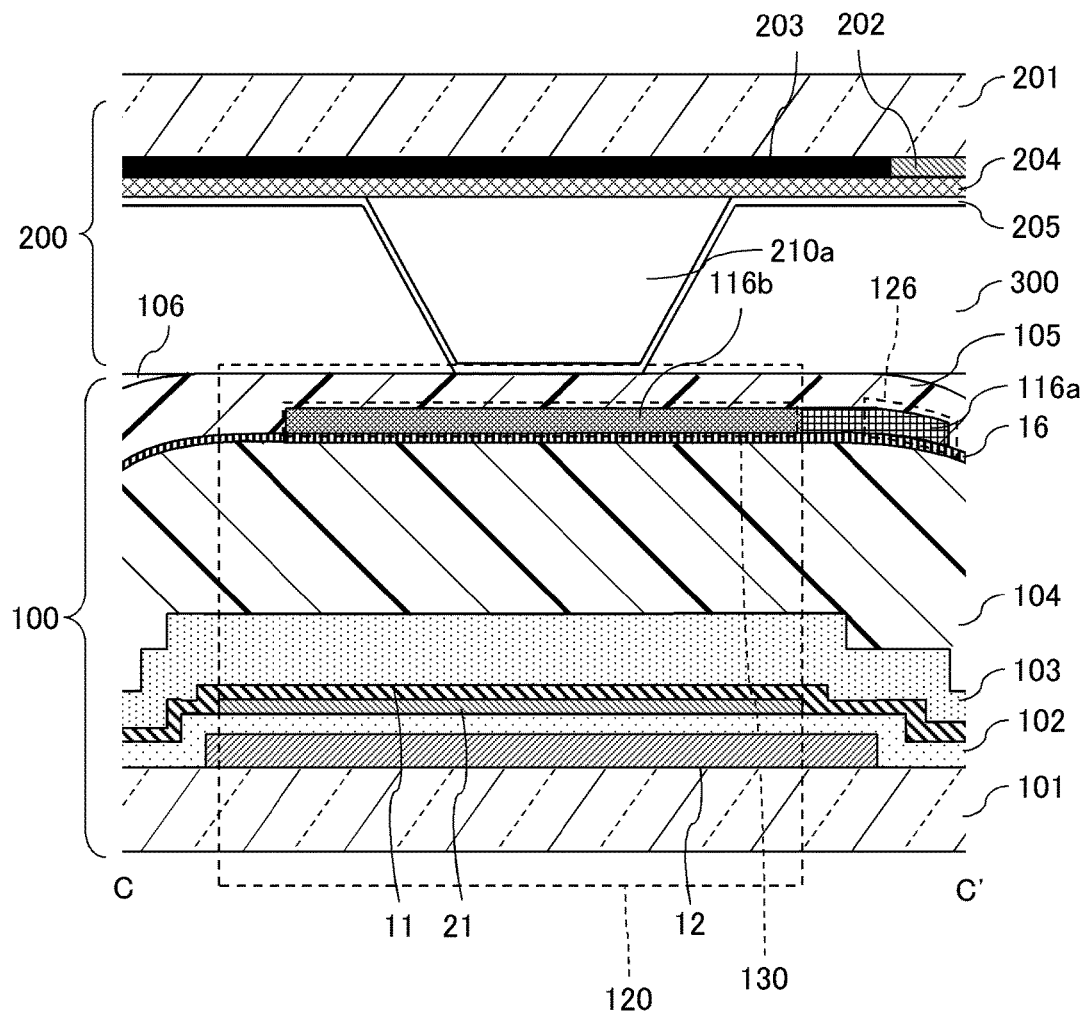
FIG. 6 is a cross-sectional view taken along a line C-C' in FIG. 4.

A specific configuration of seat 130 will be described below with reference to FIGS. 4 to 6. FIG. 4 is a partially enlarged view of TFT substrate 100. FIG. 4 illustrates a neighborhood of two thin film transistors 13 (thin film transistor 13a and thin film transistor 13b) adjacent in the row direction in display panel 10 of FIG. 2. FIG. 5 is a sectional view taken on line B-B' in FIG. 4. FIG. 5 is the sectional view taken on line B-B' while CF substrate 200 in which spacer 210 is formed adheres to TFT substrate 100 in FIG. 4. FIG. 6 is a sectional view taken on line C-C' in FIG. 4. FIG. 6 is the sectional view taken on line C-C' while CF substrate 200 in which spacer 210 is formed adheres to TFT substrate 100 in FIG. 4. The configuration on the side of TFT substrate 100 in FIGS. 4 to 6 is described above with reference to FIG. 3 except that the configuration on the side of TFT substrate 100 includes data line 11, common wiring 116 (first common wiring 116a and second common wiring 116b), superposition region 120, and seat 130. The configuration on the side of CF substrate 200 in FIGS. 5 and 6 is described above with reference to FIG. 3 except that the configuration on the side of CF substrate 200 includes spacer 210. Accordingly, the overlapping description is omitted.

The laminated structure in the region between two thin film transistors 13 adjacent in the row direction will be described below. In the region between two adjacent thin film transistors 13 adjacent in the row direction in TFT substrate 100, data line 11 is formed on semiconductor layer 21, second insulator 103 is formed so as to cover data line 11, and organic insulator 104 is formed on second insulator 103. The step reflecting the planar shapes or thicknesses of gate line 12, first insulator 102, and semiconductor layer 21 is generated in the surface of data line 11. The step reflecting the planar shapes or thicknesses of semiconductor layer 21 and data line 11 is generated in the surface of second insulator 103. The curved inclination influenced by the step generated in second insulator 103 occurs in the surface of organic insulator 104. Common electrode 16 is formed on organic insulator 104, and common wiring 116 is formed on common electrode 16. The surface of common wiring 116 is formed while reflecting the surface shape of common electrode 16. Common wiring 116 is made of a metallic material, is electrically connected to common electrode 16, and supplies common electrode 16 with the common voltage. Common wiring 116 includes first common wiring 116a that extends in the row direction between pixels 14 adjacent in the column direction and second common wirings 116b that extend in the column direction from first common wiring 116a in the region between two thin film transistors 13 adjacent in the row direction. Third insulator 105 is formed so as to cover common electrode 16 and common wiring 116. The surface of third insulator 105 is formed while reflecting the surface shapes or thicknesses of organic insulator 104, common electrode 16, and common wiring 116.

Superposition region 120 is a region facing spacer 210, and is a region where at least gate line 12, semiconductor layer 21, data line 11, and organic insulator 104 are superposed on one another in a laminated direction. As described above, sometimes the curved inclination occurs in organic insulator 104 of TFT substrate 100 by the influence of the step of the underlying layer. The display defect occurs when seat 130 is formed in the region where the inclination occurs. Therefore, in the exemplary embodiment, seat 130 is formed in a region where the inclination does not occur. That is, whole seat 130 is formed in superposition region 120 because superposition region 120 is a region facing spacer 210 and is a flat region where at least gate line 12, semiconductor layer 21, data line 11, and organic insulator 104 are superposed on one another in the laminated direction. Superposition region 120 may be a region facing spacer 210, and be a region where at least gate line 12, semiconductor layer 21, data line 11, organic insulator 104, common electrode 16, and common wiring 116 are superposed on one another in the laminated direction.

Seat 130 is formed in superposition region 120 where at least gate line 12, semiconductor layer 21, data line 11, and organic insulator 104 are superposed on one another in the laminated direction. Superposition region 120 is a region facing spacer 210. Specifically, seat 130 is superposition region 120 where gate line 12, semiconductor layer 21, data line 11, and organic insulator 104 are superposed on one another in the laminated direction, and is a step formed above organic insulator 104. Seat 130 is formed such that a whole outer periphery of seat 130 and superposition region 120 are superposed in the laminated direction. In the exemplary embodiment, common wiring 116 that is formed above organic insulator 104 in superposition region 120 is used as seat 130. Specifically, second common wiring 116b that is formed above organic insulator 104 in superposition region 120 is used as seat 130. Alternatively, both second common wiring 116b formed in superposition region 120 and third insulator 105 formed above second common wiring 116b may be used as seat 130. In superposition region 120, the region where gate line 12, semiconductor layer 21, data line 11, organic insulator 104, common electrode 16, and common wiring 116 in TFT substrate 100 are superposed on one another in the laminated direction may be defined as seat 130. Specifically, the region where gate line 12, semiconductor layer 21, data line 11, organic insulator 104, common electrode 16, and second common wiring 116b in TFT substrate 100 are superposed on one another in the laminated direction may be defined as seat 130.

A method for forming seat 130 of the exemplary embodiment will be described below. In a process of forming common wiring 116 on common electrode 16, common wiring 116 is formed such that part of common wiring 116 is included in superposition region 120. Specifically, common wiring 116 is formed such that second common wiring 116b is included in superposition region 120. Second common wiring 116b is formed into superposition region 120 having the flatness with no inclination, whereby the surface of second common wiring 116b becomes flat by reflecting the planar shape of the superposition region. In a process in which third insulator 105 is formed so as to cover common electrode 16, common wiring 116, and organic insulator 104, the region where third insulator 105 is superposed on second common wiring 116b is formed into a projecting shape by reflecting a thickness of second common wiring 116b. The surface of the region where third insulator 105 is superposed on second common wiring 116b becomes flat by reflecting the planar shape of second common wiring 116b. In the exemplary embodiment, spacer 210 contacts with at least part of the surface of the region where third insulator 105 is superposed on second common wiring 116b. Thus, seat 130 having the flatness is formed by forming second common wiring 116b in superposition region 120.

In CF substrate 200, spacer 210 is formed on overcoat layer 204, and alignment film 205 is formed so as to cover spacer 210. Spacer 210 is formed in CF substrate 200 so as to be superposed on black matrix 203 in a plan view. Spacer 210 is formed in CF substrate 200 such that at least part of the surface of spacer 210 on the side of TFT substrate 100 contacts with the surface of seat 130. Spacer 210 and seat 130 may be provided with a ratio of one or a plurality of spacers 210 and seats 130 to one pixel set including a red pixel, a blue pixel, and a green pixel, or spacer 210 and seat 130 may be provided in a ratio of one to the plurality of pixel sets. Spacer 210 can be formed into a columnar shape, a prism shape, a conical shape, or the like.

A level of the surface (the surface of third insulator 105 formed above second common wiring 116b in FIGS. 5 and 6) of third insulator 105 formed above seat 130 is higher than a level of pixel electrode 15 in the laminated direction. Therefore, in a process in which alignment film 106 is formed so as to cover pixel electrode 15, it is possible that the alignment film 106 is not formed above the seat 130. The alignment film is not formed on the surface of seat 130 contacting with spacer 210. Therefore, scratches caused by the contact between seat 130 and spacer 210 can be prevented in alignment film 106.

Common wiring 116 is not limited to the above configuration. For example, first common wiring 116a and second common wiring 116b may be formed while separating from each other. That is, first common wiring 116a extending in the row direction between pixels 14 adjacent in the column direction and second common wiring 116b extending in the column direction between pixels 14 adjacent in the row direction may be separately formed. Second common wiring 116b may be formed into an island shape in the region between two thin film transistors 13 adjacent in the row direction. That is, second common wiring 116b may be made of the same material (for example, a metallic layer) as first common wiring 116a in the same layer as first common wiring 116a while separating from first common wiring 116a. In this case, second common wiring 116b may be formed such that whole second common wiring 116b is included in superposition region 120.

Seat 130 is not limited to the configuration of second common wiring 116b. For example, a resin layer made of a resin material may be formed in superposition region 120 where gate line 12, semiconductor layer 21, data line 11, and organic insulator 104 in TFT substrate 100 are superposed on one another in the laminated direction. The resin layer may be formed on common electrode 16, or formed on third insulator 105. In the case that the resin layer is formed on third insulator 105, the surface of the resin layer contacts with spacer 210. In this case, the resin layer constructs of seat 130. Thus, in the liquid crystal display device of the exemplary embodiment, the layer (such as a second common wiring 116b, a resin layer, and a metallic layer) formed in superposition region 120 where gate line 12, semiconductor layer 21, data line 11, and organic insulator 104 are superposed on one another in the laminated direction can be defined as seat 130.

The planar shape in the region between two thin film transistors 13 adjacent in the row direction will be described below. Data line 11 extending in the column direction includes protrusion 151 that extends in the row direction in the region where data line 11 is superposed on seat 130 in a plan view. That is, a width in the row direction of data line 11 in the region where data line 11 is superposed on seat 130 in a plan view is larger than a width in the row direction of data line 11 in the region between two pixel electrodes 15 adjacent in the row direction. Gate line 12 extends in the column direction with a constant width. A width of the gate line is larger than a width in the column direction of semiconductor layer 21. Semiconductor layer 21 extends in the row direction so as to be superposed on protrusion 151 of data line 11 in the region where semiconductor layer 21 is superposed on seat 130 in a plan view. A width in the row direction of semiconductor layer 21 in the region where semiconductor layer 21 is superposed on seat 130 in a plan view is larger than a width of data line 11 in the region where semiconductor layer 21 is superposed on seat 130 in a plan view. For example, as illustrated in FIG. 4, data line 11 includes protrusion 151 that extends in the row direction toward thin film transistor 13 (thin film transistor 13b in FIG. 4), to which data line 11 is not connected, in the region between two thin film transistors 13 adjacent in the row direction. Semiconductor layer 21 extends in the row direction toward thin film transistor 13 (thin film transistor 13b in FIG. 4), to which semiconductor layer 21 is not connected, in the region between two thin film transistors 13 adjacent in the row direction.

Thus, the regions of superposition region 120 and seat 130 can be enlarged in the row direction by increasing the width in the row direction of data line 11 and the width in the row direction of semiconductor layer 21 in the region where data line 11 and semiconductor layer 21 are superposed on seat 130 in a plan view.

Desirably gate line 12, semiconductor layer 21, and data line 11 are formed while protruding from seat 130 in a plan view. In other words, desirably gate line 12, semiconductor layer 21, and data line 11 are formed while protruding from second common wiring 116b in a plan view.

Figure 7:
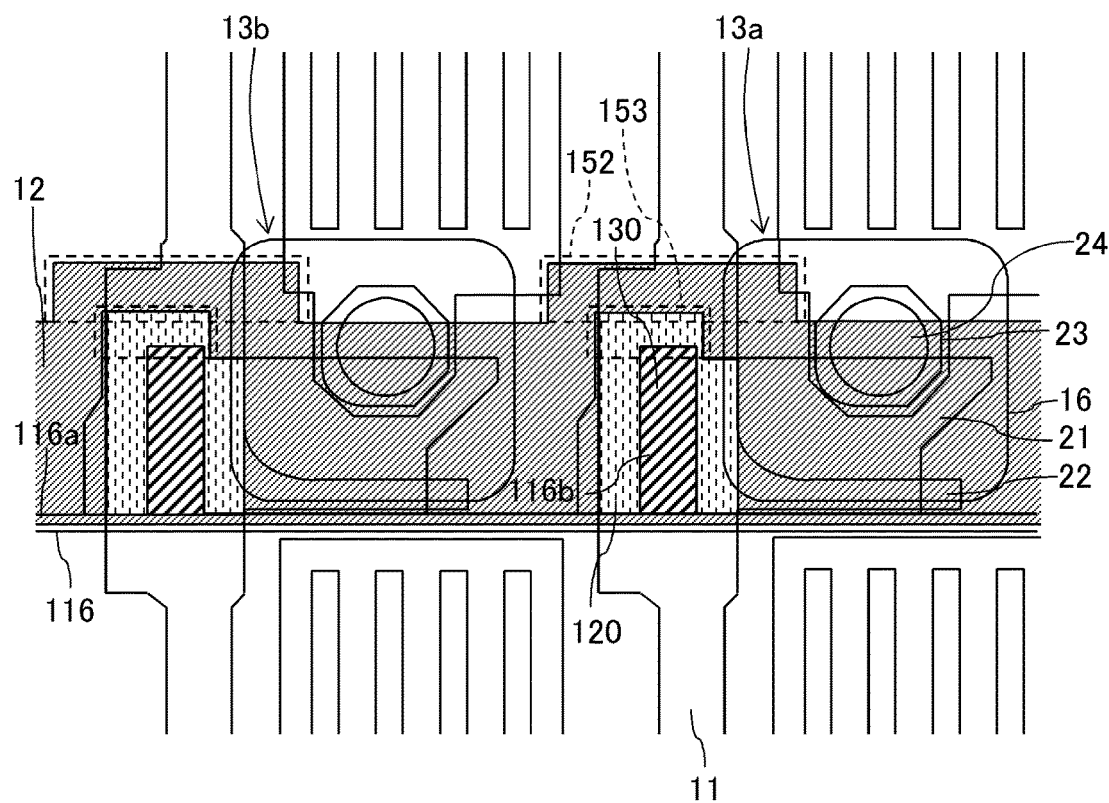
FIG. 7 is a partly expansion view illustrating a TFT substrate according to another exemplary embodiment.

TFT substrate 100 is not limited to the configuration in FIG. 4. FIG. 7 is a partially enlarged view of TFT substrate 100 according to another exemplary embodiment. TFT substrate 100 in FIG. 7 differs from TFT substrate 100 in FIG. 4 in the shapes of gate line 12, semiconductor layer 21, superposition region 120, and seat 130. Accordingly, the overlapping description is omitted.

Gate line 12 may include protrusion 152, which extends in the row direction in a gap between pixels 14 adjacent in the column direction and extends in the column direction in the region where gate line 12 is superposed on seat 130 in a plan view. Semiconductor layer 21 may include protrusion 153, which extends in the column direction in the region where semiconductor layer 21 is superposed on seat 130 in a plan view, according to protrusion 152 of gate line 12. For example, as illustrated in FIG. 7, gate line 12 includes protrusion 152 that extends in the column direction and the opposite direction to first common wiring 116a in the region between two thin film transistors 13 adjacent in the row direction. Semiconductor layer 21 includes protrusion 153 that extends in the column direction and the opposite direction to first common wiring 116a in the region between two thin film transistors 13 adjacent in the row direction.

Thus, the regions of superposition region 120 and seat 130 can be enlarged in the column direction by increasing the width in the column direction of gate line 12 and the width in the column direction of semiconductor layer 21 in the region where gate line 12 and semiconductor layer 21 are superposed on seat 130 in a plan view. Originally, the width in the column direction of gate line 12 is preferably narrowed in order not to degrade the numerical aperture of the pixel. Gate line 12 of the exemplary embodiment includes the protrusion extending in the column direction in the region between two thin film transistors 13 adjacent in the row direction, so that the width in the column direction of gate line 12 can be kept narrow in other regions. Accordingly, in the configuration of gate line 12 of the exemplary embodiment, the region of seat 130 can be enlarged while the numerical aperture of the pixel is maintained.

In the above, the specific embodiments of the present application have been described, but the present application is not limited to the above-mentioned embodiments, and various modifications may be made as appropriate without departing from the spirit of the present application.

What is claimed is:

1. A display device comprising:
   a first substrate;
   a second substrate facing the first substrate; and
   a spacer disposed between the first substrate and the second substrate,
   wherein the first substrate includes:
      a plurality of gate lines extending in a row direction;
      a first insulator covering the plurality of gate lines;
      a semiconductor layer formed on the first insulator;
      a plurality of data lines formed on the semiconductor layer to extend in a column direction;
      a second insulator covering the plurality of data lines;
      an organic insulator formed on the second insulator;
      a plurality of pixel electrodes;
      a common electrode that is facing the plurality of pixel electrodes and is formed on the organic insulator; and
      a common wiring that is electrically connected to the common electrode and is formed on the common electrode,
   wherein the common wiring includes a first common wiring that extends in the row direction and extends between pixels adjacent in the column direction, and a second common wiring that extends in the column direction from the first common wiring,
   the spacer is facing a seat region where at least a gate line of the plurality of gate lines, the semiconductor layer, a data line of the plurality of data lines, the organic insulator, and the second common wiring are superposed on one another in a laminated direction, and
   the second common wiring is formed integrally with the first common wiring.

2. The display device according to claim 1, wherein the first substrate further includes a third insulator,
   the third insulator is formed so as to cover the common electrode and the common wiring, and
   the plurality of pixel electrodes is formed on the third insulator.

3. The display device according to claim 1, wherein the gate line, the semiconductor layer, and the data line protrude from the seat region in a plan view.

4. The display device according to claim 1, wherein the gate line includes a protrusion that extends in the column direction in a region where the gate line overlaps the seat region in a plan view.

5. The display device according to claim 1, wherein the data line includes a protrusion that extends in the row direction in a region where the data line overlaps the seat region in a plan view.

6. The display device according to claim 1, wherein the second common wiring extends between two thin film transistors adjacent in the row direction.

* * * * *